(12) United States Patent
Fafet et al.

(10) Patent No.: US 8,635,931 B2
(45) Date of Patent: Jan. 28, 2014

(54) FLEXIBLE FLYWHEEL

(75) Inventors: Olivier Fafet, Quend-Plage (FR); Daniel Fenioux, Saleux (FR); Michel Graton, Paris (FR); Lionel Renier, Canaples (FR)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 13/143,135

(22) PCT Filed: Dec. 9, 2009

(86) PCT No.: PCT/FR2009/052464
§ 371 (c)(1),
(2), (4) Date: Sep. 26, 2011

(87) PCT Pub. No.: WO2010/079274
PCT Pub. Date: Jul. 15, 2010

(65) Prior Publication Data
US 2012/0031225 A1 Feb. 9, 2012

(30) Foreign Application Priority Data
Jan. 8, 2009 (FR) ...................................... 09 50077

(51) Int. Cl.
*F16F 15/12* (2006.01)
(52) U.S. Cl.
USPC ........................................................ 74/574.4

(58) Field of Classification Search
USPC .................................. 74/574.2, 574.3, 574.4
See application file for complete search history.

(56) References Cited

U.S. PATENT DOCUMENTS

| 4,795,012 A | * | 1/1989 | Durum ............................ 464/99 |
| 5,669,820 A | * | 9/1997 | Fukushima ..................... 464/98 |
| 6,280,334 B1 | * | 8/2001 | Tsuchiya et al. ................ 464/98 |

FOREIGN PATENT DOCUMENTS

| EP | 0717211 | 6/1996 |
| EP | 0984184 | 3/2000 |
| FR | 2827653 A1 * | 1/2003 |
| WO | WO 03/008839 | 1/2003 |

\* cited by examiner

*Primary Examiner* — Vicky Johnson
(74) *Attorney, Agent, or Firm* — Berenato & White, LLC

(57) ABSTRACT

The invention relates to a flexible flywheel (2), in particular for a motor vehicle, comprising at least two stacked flexible discs (9, 10, 11). The inner peripheries (12) of the flexible discs are secured to a drive shaft, and the outer peripheries (30) of are secured to an inertia mass (31). Each flexible disc (9, 10, 11) includes at least two parallel flat parts (15, 16, 17), which are offset axially (D1, D2) and connected to one another by a curved part (18, 19). The curved parts (18, 19) of the discs (9, 10, 11) are substantially nested one inside the other, characterized in that, in at least one region adjacent to a curved part, the discs (9, 10, 11) are spaced one from the other so as to form a space (23, 27, 29) which facilitates the axial deformation of the discs (9, 10, 11).

13 Claims, 5 Drawing Sheets

FLEXIBLE FLYWHEEL

CROSS-REFERENCE TO RELATED APPLICATIONS AND CLAIM TO PRIORITY

This application relates to International Application No. PCT/FR2009/052464 filed Dec. 9, 2009 and French patent application Ser. No. 09/50077 filed Jan. 8, 2009, of which the disclosures are incorporated herein by reference and to which priority is claimed.

FIELD OF THE INVENTION

The present invention relates to flexible flywheel, such as, for example, a primary flexible flywheel for a double damping flywheel, in particular in a torque transmission system for a motor vehicle.

BACKGROUND OF THE INVENTION

A double damping flywheel comprises two coaxial inertia flywheels, i.e. a primary flywheel which is fitted fixed at the end of the crankshaft, and a secondary flywheel which forms a reaction plate of the clutch. The secondary flywheel is centred and guided in rotation on the primary flywheel by means of a bearing.

A torsion damper with springs and friction means is fitted between the two flywheels, in order to transmit rotational torque from one flywheel to the other, whilst absorbing and damping the vibrations and impacts.

The ends of the springs are supported on stops which are integral with the flywheels, and are arranged such that any rotation or oscillation of one flywheel relative to the other gives rise to compression of the springs of the damper in one direction or the other, and is countered by this compression.

The axial frequency of the primary flywheel itself must be low, for example lower than 50 Hz, so that it does not begin to resonate when the engine is running at low speed. For this purpose it is known to use a flexible primary flywheel comprising at least two stacked flexible discs, the inner peripheries of which are designed to be secured to a drive shaft, and the outer peripheries of which are designed to be secured to an inertia mass, each flexible disc comprising two flat parallel parts which are offset axially and are connected to one another by a curved part. The flexible discs have identical profiles, and are superimposed on one another and nested in one another. A structure of this type is known in particular from document EP 0 984 184.

The axial vibrations of the flexible flywheel generate deformation of the aforementioned discs. Since the curved parts of the discs are nested in one another without play, the discs cannot be displaced radially relative to one another, which gives rise to buttressing of the discs at the level of their curved part, and thus to stiffening of the assembly. This tends to reduce the efficiency of the flexible flywheel.

SUMMARY OF THE INVENTION

The object of the invention is in particular to provide a simple, efficient and economical solution to this problem.

For this purpose, the invention proposes a flexible flywheel, in particular for a motor vehicle, comprising at least two stacked flexible discs, the inner peripheries of which are designed to be secured to a drive shaft, and the outer peripheries of which are designed to be secured to an inertia mass, each flexible disc comprising at least two parallel flat parts, which are offset axially and connected to one another by a curved part, the curved parts of the discs being substantially nested one inside the other or inside one another, characterised in that, in at least one region adjacent to a curved part, the discs are spaced from one another so as to form a space which facilitates the axial deformation of the discs.

By this means, the occurrence of the phenomenon of buttressing or stiffening of the discs under the effect of the axial vibrations is avoided.

According to one embodiment of the invention, the curved parts of the discs are offset radially and axially from one disc to the other.

According to a characteristic of the invention, the axial distance between the curved parts of the discs is between 0.5 and 5 mm at rest, in other words when the flexible discs are not being subjected to stress by the axial vibrations, and are therefore not deformed.

Advantageously, the radial distance between the curved parts of the discs is between 0.5 and 5 mm (at rest).

According to one embodiment of the invention, the axial distances between the flat parts of the discs are zero or substantially zero.

As a variant, the flat parts of the discs are spaced axially in at least one region which is adjacent to a curved part, for example by a distance of less than 1 mm.

According to a preferred embodiment of the invention, the flexible flywheel comprises three stacked flexible discs.

In general, the flexible discs are made of steel plate, and have a thickness of between 0.5 and 12 mm. They can in that case be manufactured by stamping.

Advantageously, each curved part comprises two annular connection shoulders which respectively connect each of the flat parts to a curved annular part, the curvature of which has a point of inflection.

According to one possible embodiment of the invention, the radius of curvature of each connection shoulder is between 5 and 40 mm.

As a variant, each curved part comprises two annular connection shoulders which connect each of the flat parts respectively to a frusto-conical part.

Preferably, each flexible disc comprises three successive parallel flat parts, which are offset axially from one another relative to the others, the flat parts being connected in pairs by curved parts.

Each disc then comprises a radially inner curved part and a radially outer curved part which are opposite one another, such that each radially outer flat part extends on a plane which is disposed axially between the planes of the two other corresponding flat parts.

The flexible flywheel according to the invention can be an inertia flywheel which is fitted at the end of a crankshaft, and forms the reaction plate of a clutch, or it can be a primary flywheel of a double damping flywheel.

The invention also proposes a double damping flywheel, in particular for a motor vehicle, characterised in that it comprises a primary flywheel formed by a flexible flywheel of the above-described type.

BRIEF DESCRIPTION OF THE DRAWINGS

The invention will be better understood, and other details, characteristics and advantages of it will become apparent, from reading the following description provided by way of non-limiting example with reference to the attached drawings, in which.

DETAILED DESCRIPTION

Figure 1:
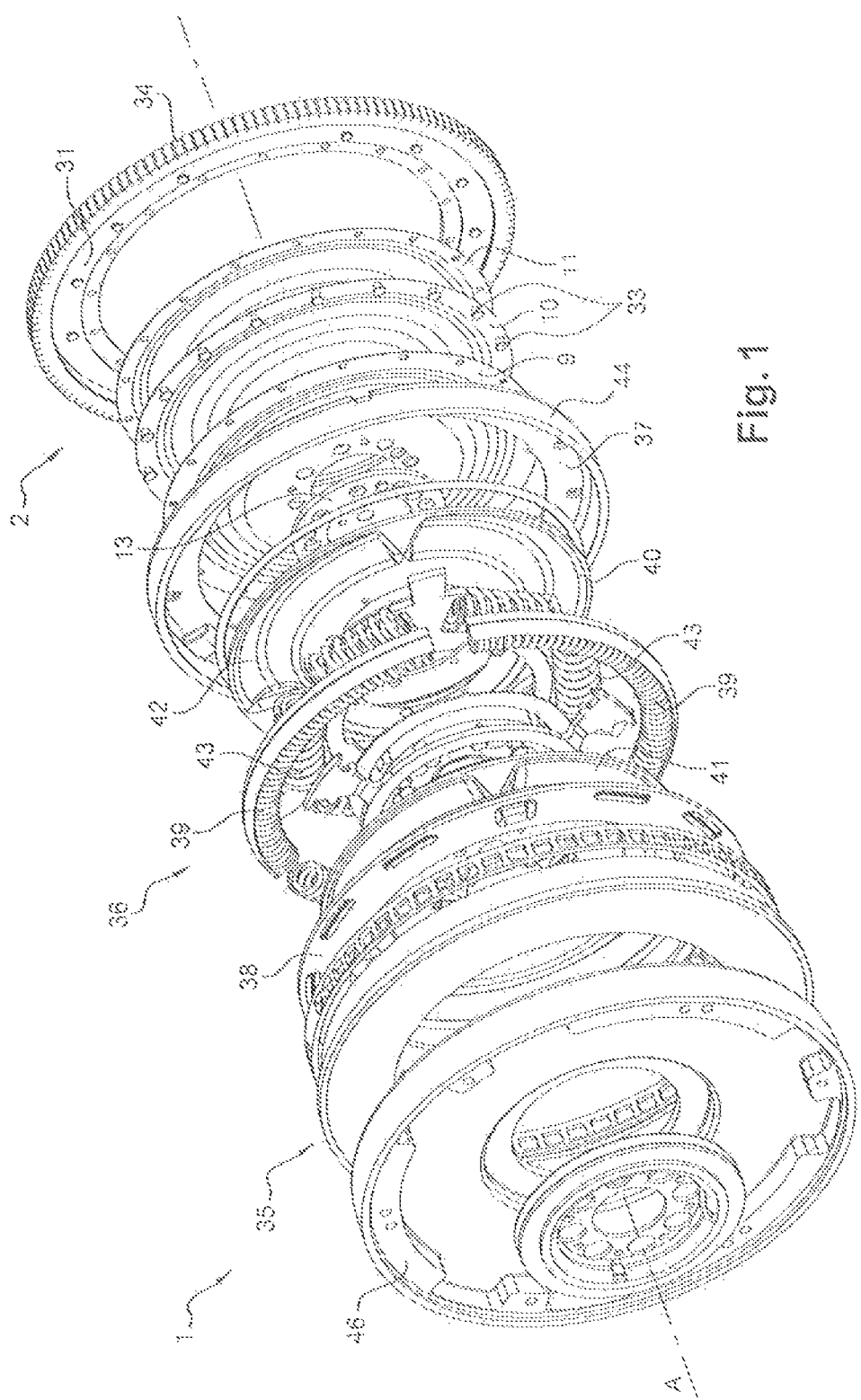
FIG. 1 is an exploded perspective view of a double damping flywheel according to the invention.
Figure 2:
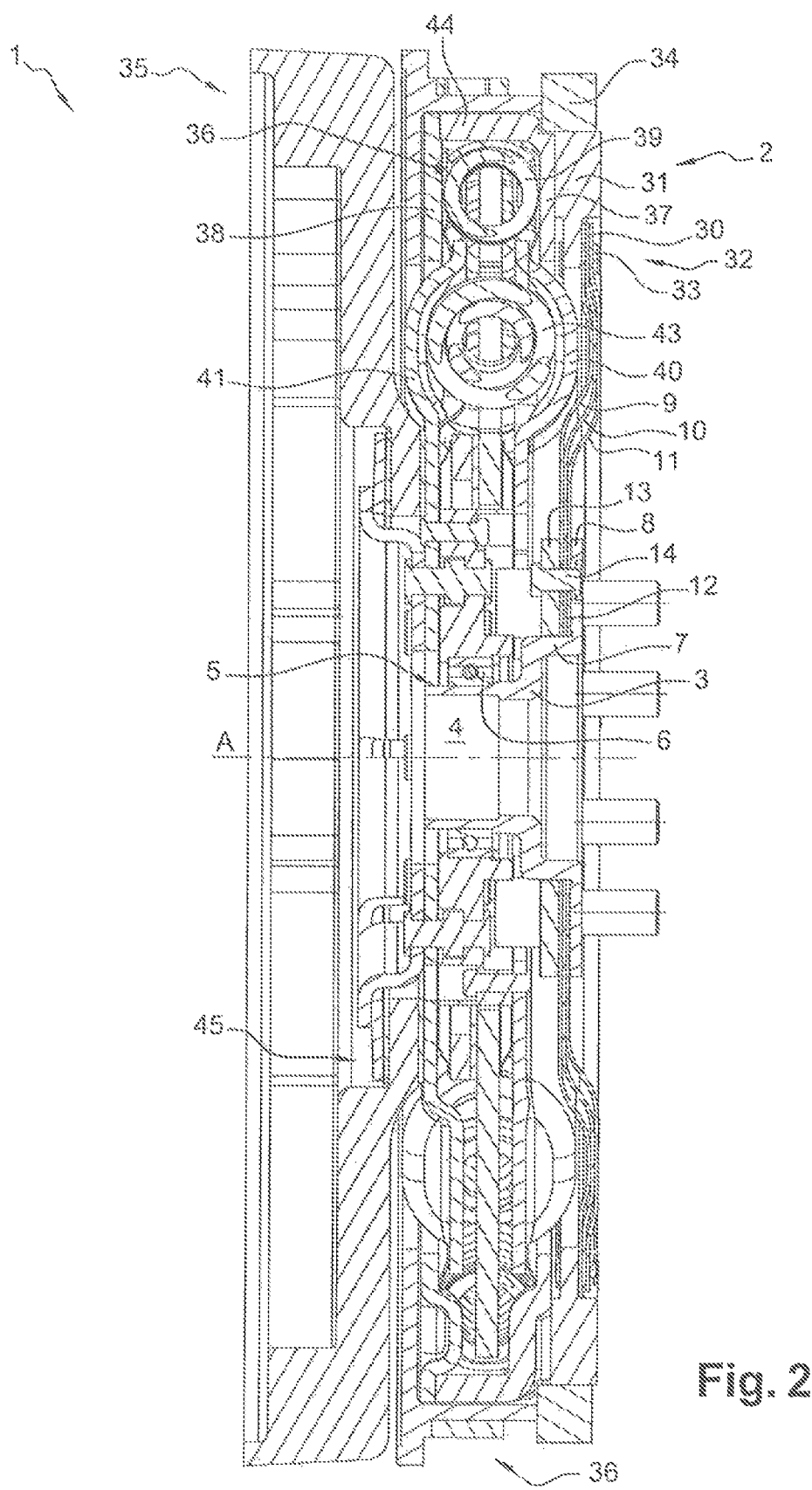
FIG. 2 is a view in axial cross-section of the double damping flywheel in FIG. 1.
Figure 3:
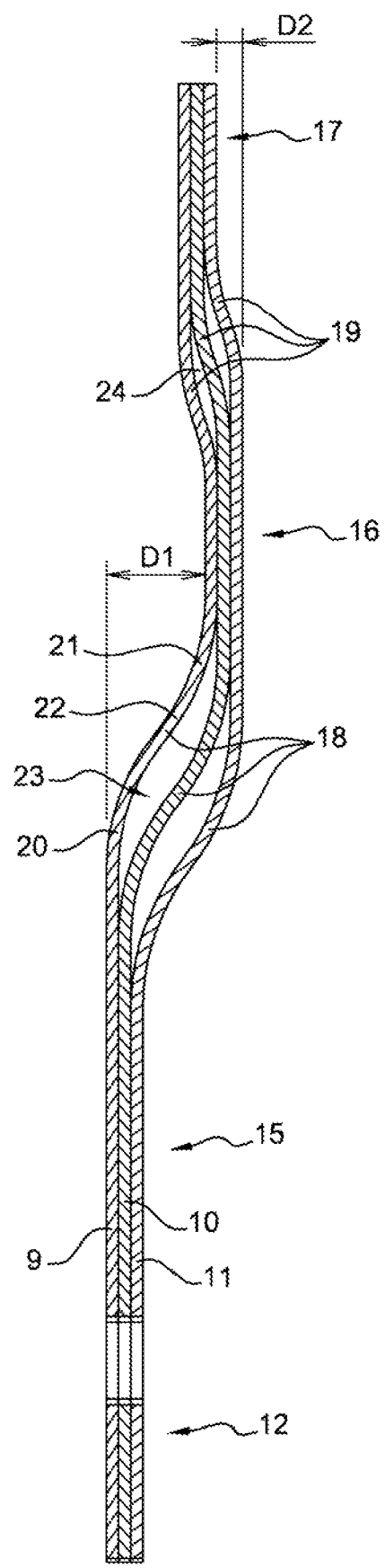
FIG. 3 is a detailed view of the discs.
Figure 6:
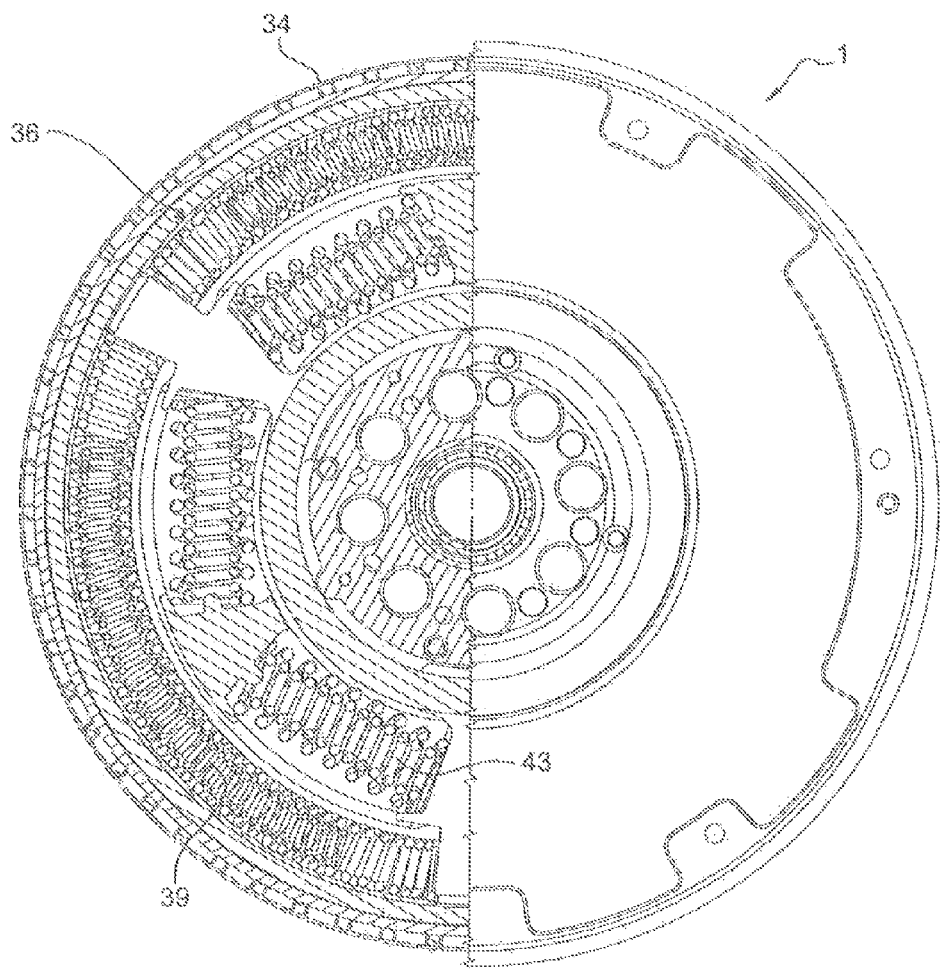
FIG. 6 is a front view, in partial cross-section of the double damping flywheel in FIG. 1.

FIGS. 1, 2 and 6 represent a double damping flywheel 1 according to the invention, which is designed to couple an engine, for example an engine of the diesel type, to a gear box of a motor vehicle.

This double damping flywheel comprises a primary flywheel 2, which is designed to be secured to the end of a crankshaft of the engine by screws or bolts.

The primary flywheel 2 comprises a central appendage 3 with an axis A, with a generally tubular form, comprising a first part 4 which has a cylindrical outer surface 5 around which there is fitted a bearing 6, which part is extended by a second part 7 with a larger diameter which forms a collar, and the front end of which has a flange 8 which extends radially towards the exterior.

The primary flywheel 2 additionally comprises at least two discs made of steel plate, and preferably three discs 9, 10, 11 which are stacked on one another, and are fitted around the second part 7 of the central appendage 3. The mean thickness of the discs is between 0.5 and 1.2 mm.

An inner peripheral part 12 of each of the discs 9 to 11 is clamped between the flange 8 and a washer 13, which is fitted around the second part 7, to the rear of the flange 8, the assembly being secured by rivets 14.

Each disc 9 to 11 is of the curved type, and comprises an inner peripheral part 15, a median part 16, and an outer peripheral part 17, which are flat and parallel, and extend transversely relative to the axis A.

The inner peripheral part 15 is connected to the median part 16 by a first curved part 18, the median peripheral part 16 being connected to the outer peripheral part 17 by a second curved part 19.

The first curved parts 18 of the discs 9 to 11 are oriented in the same direction, and are substantially parallel to one another, the discs being nested in one another.

The second curved parts 19 of the discs 9 to 11 are oriented in the opposite direction to that of the first curved parts 18, such that each outer peripheral part 17 extends on a plane which is disposed axially between the planes of the inner 15 and median 16 flat parts.

More particularly, the median flat parts 16 are disposed to the front of the inner flat parts 15, and the outer flat parts 17 are disposed to the rear of the median flat parts 16.

This arrangement limits the axial dimension of the double damping flywheel 1.

The axial distance D1 between the median part 16 of a disc and its inner peripheral part 15 is between 2 and 10 mm, and these distances D1 are substantially identical for the three discs 9 to 11.

The axial distance D2 between the outer peripheral part 17 of a disc and its median part 16 is between 0.5 and 5 mm, and these distances D2 are substantially identical for the three discs 9 to 11.

Figure 4:
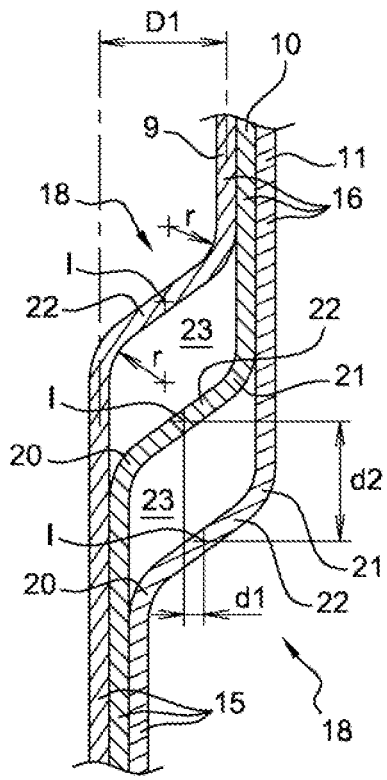
FIG. 4 is a detailed view of the curved parts of the discs.

As can be seen better in FIG. 4, each first curved part 18 comprises a radially inner annular connection shoulder 20 and a radially outer annular connection shoulder 21, which connect respectively the inner peripheral part 15 and the median part 16 to an arched annular part 22, the curvature of which has a point of inflection 1.

Each shoulder 20, 21 has a radius of curvature r of between 5 and 40 mm, and preferably between 10 and 20 mm.

It will be appreciated that the arched annular part 22 could be replaced by a frusto-conical part.

The first curved parts 18 of two adjacent discs are offset axially by a distance d1 corresponding substantially to the thickness of a disc in the case of FIG. 4, since the flat parts 15, 16 of the discs 9 to 11 are in contact on one another. The first curved parts 18 are also offset radially by a distance d2 of between 0.5 and 5 mm.

Thus, an annular space 23 is formed between two adjacent discs, this space being delimited by a portion of flat part 15 of a disc, for example the median disc 10, by the radially inner wall, with a concave form, of the inner shoulder 20 of the disc 10, by the radially inner wall of the arched annular region 22 of the disc 10, by the radially inner wall, with a convex form, of the outer shoulder 21 of the disc 10, by a portion of flat part 16 of the disc 11, which is situated directly to the front of the first disc 10, by the radially outer wall, with a concave form, of the outer shoulder 21 of the disc 11, by the radially outer wall of the arched annular region 22 of the disc 11, and by the radially inner wall, with a convex form, of the inner shoulder 20 of the disc 11.

The second curved parts 19 have a structure similar to that of the first curved parts 18, and define in the same manner an annular space 24 between two adjacent discs. It should be remembered however that the second curved parts 19 are oriented in the direction opposite that of the first curved parts 18.

Figure 5:
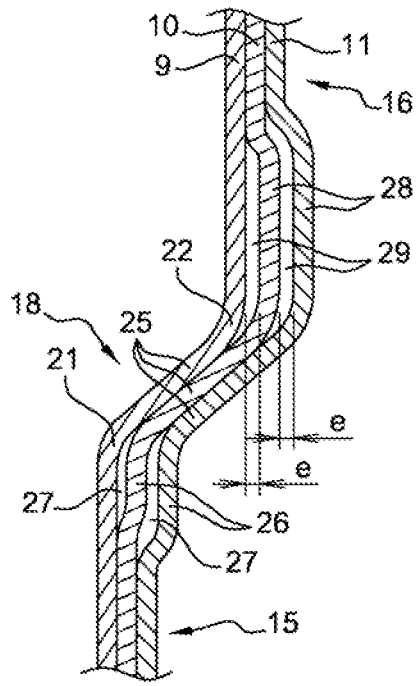
FIG. 5 is a view corresponding to FIG. 4, representing a variant embodiment of the invention.

According to a variant embodiment of the invention, represented in FIG. 5, it is the flat parts of the discs adjacent to the curved parts which are offset axially relative to one another, at rest, in order to prevent buttressing of the discs during functioning. In FIG. 5, each first curved part 18 comprises a radially inner annular connection shoulder 20 and a radially outer annular connection shoulder 21, which connect respectively the inner peripheral part and the median part to a frusto-conical part 25.

The median 10 and front 11 discs each have a first set-back 26 towards the front, at the level of the flat inner parts 15, such as to delimit spaces 27 between the discs 9 and 10 and between the discs 10 and 11.

Each disc 10 and 11 additionally has a second set-back 28 towards the front, at the level of the flat median parts 16, such as to delimit spaces 29 between the discs 9 and 10 and between the discs 10 and 11.

The set-backs 26 and 28 are adjacent to the first curved parts 18.

The spacing e between the discs is preferably less than 1 mm.

In each of the above-described variants, the spaces 27, 29 formed between the discs 9 to 11 have dimensions such as to permit the free deformation of the discs 9 to 11 when they are subjected to axial displacements, such as to avoid the occurrence of the phenomenon of buttressing or stiffening of the discs which occurred in the prior art. For this purpose it is necessary to assure that, for maximum deformation of the discs 9 to 11, spacing exists between the discs, even if this is only slight.

The outer peripheral parts 30 of the discs 9 to 11 are secured to a first inertia mass 31 made of cast iron or steel, with a generally annular form, which surrounds the sheet metal discs 9 to 11.

More particularly, the first inertia mass 31 has a hollow annular region 32 in which the outer edges of the discs 9 to 11 are secured by rivets 33. The first inertia mass 31 additionally supports a toothed starter ring 34 on its outer periphery.

The double damping flywheel 1 also comprises a secondary flywheel 35, comprising a second inertia mass 46, which acts as a reaction plate of a clutch mechanism.

In a conventional manner, the rear radial surface of the second inertia mass 46 forms a support surface for a friction disc (not represented), which is connected in rotation with an intake shaft of the gear box, and is thrust by a pressure plate which is integral in rotation with the secondary flywheel, when the clutch is in the engaged position.

The secondary flywheel 35 is centred and guided in rotation on the central appendage of the primary flywheel 2, by means of the bearing 6.

The primary 2 and secondary 35 flywheels are coupled by a torsion damper 36, which is designed to absorb and damp the vibrations and acyclisms generated by the motor vehicle engine.

The torsion damper comprises two guide washers 37, 38 which are rendered integral in rotation with the primary flywheel 2 by means of rivets or screws, and delimit between one another receptacles in which there are fitted arched springs 39 which are distributed circumferentially around the axis A.

The torsion damper 36 also comprises two guide washers 40, 41 which are rendered integral in rotation with the secondary flywheel 35 by means of rivets or screws, and delimit between one another receptacles 42 in which there are fitted straight springs 43 which are distributed circumferentially around the axis A.

On its radially outer periphery, the guide washer 37 comprises a flange 44 which extends axially as thr as the guide washer 38. This flange 44 can retain a viscous lubricant, such as grease or oil, around the arched springs 39, thus in particular preventing this lubricant from escaping under the effect of a centrifugal force. In addition, this flange 44 can also retain the arched springs 39 when they are subjected to centrifugal force, at a high engine speed.

The damping means additionally comprise friction means which are fitted between the two inertia masses 31, 46, and make it possible to damp the vibrations and acyclisms absorbed by the springs 39, 43, by braking the oscillations relating to the two inertia masses 31, 46.

Finally, the double damping flywheel 1 can also comprise torque limitation means 45 which are integrated in the secondary flywheel 35.

The invention claimed is:

1. A flexible flywheel (2), comprising:
an inertia mass (31);
at least two stacked flexible discs (9, 10, 11) having inner peripheral parts (12) adapted to be secured to a drive shaft, and outer peripheral parts (30) secured to the inertia mass (31);
each of the flexible discs (9, 10, 11) comprising at least two parallel flat parts (15, 16, 17) offset axially (D1, D2) and connected to one another by at least one curved part (18, 19);
the curved parts (18, 19) of the flexible discs (9, 10, 11) being substantially nested one inside the other;
the at least two flexible discs (9, 10, 11) being spaced from each other in at least one region adjacent to the curved parts thereof so as to form a space (23, 27, 29) between the adjacent flexible discs in order to facilitate the axial deformation of the flexible discs (9, 10, 11).

2. The flexible flywheel (2) according to claim 1, wherein the flat parts (15, 16) of each of the discs (9, 10, 11) are spaced axially in at least one region (26, 28) adjacent to the curved part.

3. The flexible flywheel (2) according to claim 1, wherein the flexible flywheel comprises three stacked flexible discs (9, 10, 11).

4. The flexible flywheel (2) according to claim 1, wherein the flexible discs (9, 10, 11) are made of steel plate, and have a thickness of between 0.5 and 1.2 mm.

5. The flexible flywheel (2) according to claim 1, wherein the at least one curved part (18) of each of the flexible discs comprises two annular connection shoulders (20, 21) which respectively connect each of the flat parts (15, 16) to a curved annular part (22), the curvature of which has a point of inflection (1).

6. The flexible flywheel (2) according to claim 5, wherein a radius of curvature (r) of each of the connection shoulders (20, 21) is between 5 and 40 mm.

7. A double damping flywheel comprising a primary flywheel defined by the flexible flywheel (2) according to claim 1 and a secondary flywheel coupled by a torsion damper.

8. A flexible flywheel (2), comprising:
an inertia mass (31);
at least two stacked flexible discs (9, 10, 11) having inner peripheral parts (12) adapted to be secured to a drive shaft, and outer peripheral parts (30) adapted to be secured to the inertia mass (31);
each of the flexible discs (9, 10, 11) comprising at least two parallel flat parts (15, 16, 17) offset axially (D1, D2) and connected to one another by at least one curved part (18, 19);
the curved parts (18, 19) of the flexible discs (9, 10, 11) being substantially nested one inside the other;
the at least two flexible discs (9, 10, 11) being spaced from each other in at least one region adjacent to the curved parts thereof so as to form a space (23, 27, 29) between the adjacent flexible discs in order to facilitate the axial deformation of the flexible discs (9, 10, 11);
the curved parts (18) of the flexible discs (9, 10, 11) being offset radially (d2) and axially (d1) from one of the flexible discs to the other.

9. The flexible flywheel (2) according to claim 8, wherein the axial distance (d1) between the curved parts (18) of the flexible discs (9, 10, 11) is between 0.5 and 5 mm when the flexible discs are at rest.

10. The flexible flywheel (2) according to claim 9, wherein the radial distance (d2) between the curved parts (18) of the flexible discs (9, 10, 11) is between 0.5 and 5 mm when the flexible discs are at rest.

11. A double damping flywheel comprising a primary flywheel defined by the flexible flywheel (2) according to claim 8 and a secondary flywheel coupled by a torsion damper.

12. A flexible flywheel (2), comprising:
an inertia mass (31);
at least two stacked flexible discs (9, 10, 11) having inner peripheral parts (12) adapted to be secured to a drive shaft, and outer peripheral parts (30) adapted to be secured to the inertia mass (31);
each of the flexible discs (9, 10, 11) comprising at least two parallel flat parts (15, 16, 17) offset axially (D1, D2) and connected to one another by at least one curved part (18, 19);
the curved parts (18, 19) of the flexible discs (9, 10, 11) being substantially nested one inside the other;
the at least two flexible discs (9, 10, 11) being spaced from each other in at least one region adjacent to the curved parts thereof so as to form a space (23, 27, 29) between the adjacent flexible discs in order to facilitate the axial deformation of the flexible discs (9, 10, 11);

the at least one curved part (18) of each of the flexible discs comprising two annular connection shoulders (21, 22) connecting each of the flat parts (15, 16) respectively to a frusto-conical part (25).

13. The flexible flywheel (2) according to claim 12, wherein the at least two parallel flat parts of each of the flexible discs (9, 10, 11) comprise three successive parallel flat parts (15, 16, 17) offset axially (D1, D2) relative to one another; wherein the at least one curved part comprises two curved parts; and wherein the three successive parallel flat parts being connected in pairs by the curved parts (18, 19).

* * * * *